United States Patent [19]
Verest

[11] 3,843,981
[45] Oct. 29, 1974

[54] TOOL

[76] Inventor: Ralph W. Verest, 4515 N. Pulaski Rd., Chicago, Ill. 60630

[22] Filed: Aug. 28, 1972

[21] Appl. No.: 284,102

[52] U.S. Cl.................... 7/1 G, 81/177 A, 254/131, 294/24, 74/544
[51] Int. Cl............................................. B25f 1/00
[58] Field of Search ......... 7/1 R; 81/177 A; 74/544; 254/77, 131; 294/24, 10, 12, 23, 82, 19

[56] References Cited
UNITED STATES PATENTS

| 103,007 | 5/1870 | Bibber | 7/1 R |
| 179,127 | 6/1876 | Norcross | 7/1 R |
| 3,644,951 | 2/1972 | Colburn | 294/24 |
| 3,657,944 | 4/1972 | Able | 81/177 A |

FOREIGN PATENTS OR APPLICATIONS

| 334,034 | 10/1903 | France | 7/1 R |
| 511,711 | 6/1952 | Belgium | |

*Primary Examiner*—Al Lawrence Smith
*Assistant Examiner*—Roscoe V. Parker
*Attorney, Agent, or Firm*—Bernard L. Kleinke

[57] ABSTRACT

A tool for use by truck operators includes an elongated member rigid throughout its length terminating at its rear end portion in a handle and terminating at its front end portion in a socket having a recess therein adapted to receive a load binder handle. A hook extends from the socket and is adapted to engage a fifth-wheel release mechanism handle. In use, the tool may serve as an extension of a load binder handle for facilitating the locking and release of a load binder for a vehicle, and it may also be used to conveniently engage with the hook thereon a fifth-wheel release mechanism handle which is normally not located in an accessible area of a trailer. The tool also serves the purpose of checking the tire pressure of the vehicle by enabling the operator to strike the tires with the socket end of the tool, whereby the operator can by observing the sound of the tool against the tire determine whether or not the tires are under inflated in a quick and easy manner.

8 Claims, 6 Drawing Figures

PATENTED OCT 29 1974 3,843,981
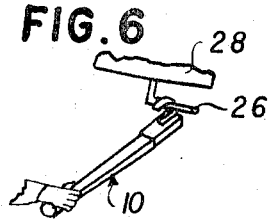
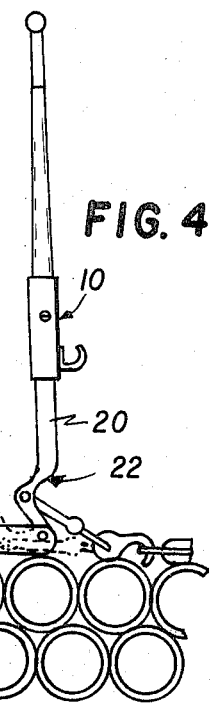
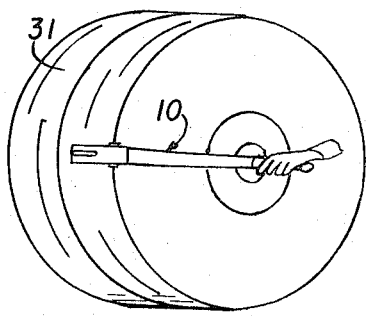
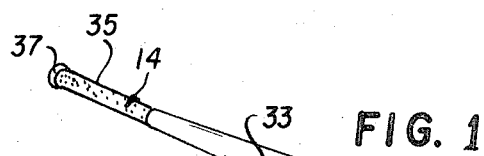
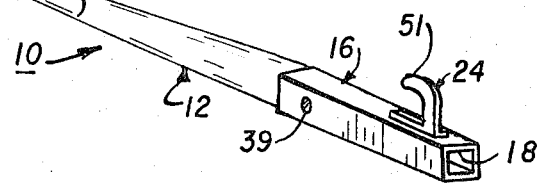
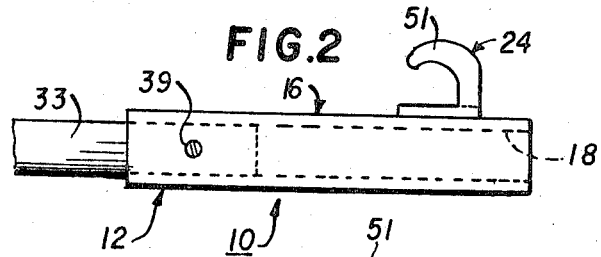
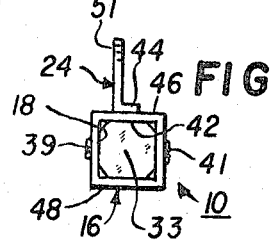

TOOL

The present invention relates to a tool, and it more particularly relates to a tool for use by truck operators.

There are two common problems experienced by operators of tractor-trailer trucks in preparing them for travel and for unloading them. In loading such a vehicle, an over-center type manually-operable load binder is oftentimes employed to secure a load in place on the vehicle. However, due to the relatively short handle on the binder and due to the fact that the handle snaps back quickly once moved beyond the over-center position during either a locking or a releasing operation, many severe injuries have occurred. In an attempt to overcome this serious problem, several complicated devices for attaching to the binder handles have been employed and are disclosed in U.S. Pat. Nos. 3,119,278 and 3,179,372. However, it would be highly desirable to have such a device which would effectively eliminate or minimize greatly the chances of injury from the operation of such a load binder, and which would be simple to operate and inexpensive to manufacture.

Another problem associated with tractor-trailer trucks is in the use of a fifth-wheel coupler which connects a trailer to a tractor. In this regard, the handle for the release mechanism of such a fifth-wheel coupler is normally not located in an readily accessible location, and thus when the truck driver attempts to operate the release handle, he must reach around the tires and under the coupling mechanism to gain access to the release handle. In so doing, the clothing of the driver may be damaged or he may sustain an injury to his person. Therefore, it would also be highly desirable to have a tool which facilitates the operation of the fifth-wheel coupling mechanism handle without causing injury to the operator or his clothing. Moreover, it would be highly desirable to have a single tool which facilitates the operation of the load binder and also the fifth-wheel release mechanism. Also, it would be desirable to have a single tool which in addition to the foregoing uses, can also be employed to test the pressure of the tires of the vehicle in a quick and easy manner. Furthermore, such a tool should be inexpensive to manufacture and easy to use.

Therefore, the principal object of the present invention is to provide a new and improved tool, which may be used by tractor-trailer truck operators for facilitating the operation of a load binder and a fifth-wheel coupling mechanism, and which may also be used to check the tire pressure of the vehicle in a quick and efficient manner.

Another object of the present invention is to provide such a new and improved tool, which may be manufactured inexpensively and which is simple and efficient to use.

Briefly, the above and further objects of the present invention may be realized by providing a tool including an elongated member rigid throughout its length terminating at its rear end portion in a handle and terminating at its front end portion in a socket having a recess therein adapted to receive a load binder handle. A hook extends from the socket and is adapted to engage a fifth-wheel release mechanism handle. In use, in order to facilitate the operation of the load binder, the socket of the tool may be slipped over the load binder handle, and then the handle portion of the tool may be grasped, whereby the tool serves as an extension of the load binder handle to provide sufficient leverage to assist the locking or releasing of the load binder. The hook extending from the socket is used to engage a fifth-wheel release mechanism handle so that the tool may then be used to readily gain access to such a mechanism handle in such a manner that the operator is not required to reach under the fifth-wheel mechanism and thus injury to the person or damage to the clothing of the operator is avoided. For the purpose of quickly and easily checking the tire pressure of the vehicle, the operator may grasp the handle of the tool and strike the tire to be checked with the socket end of the tool, whereby the operator can observe the impact made by the tool against the tire treads and thus determine whether or not the pressure is adequate. The socket of the tool is preferably square or rectangular in cross section so that the tool may be stored on the truck trailer without securing it in place, since it can merely rest on the floor of the truck without rolling therefrom.

The invention, both as to its organization and method of operation, together with further objects and advantages thereof will best be understood by reference to the following detailed description taken in connection with the accompanying sheet of drawings, wherein:

FIG. 1 is a perspective view of the tool of the present invention;

FIG. 2 is an enlarged, fragmentary view of the socket of the tool of FIG. 1;

FIG. 3 is a front end view of the socket of FIG. 2;

FIG. 4 is a front elevational view of the tool of FIG. 1 showing its use in operating a load binder;

FIG. 5 is an elevational view of the tool of FIG. 4 showing its use in checking pressure of a vehicle tire; and FIG. 6 is a perspective view of the tool of FIG. 1 illustrating its use in operating a fifth-wheel release mechanism handle.

Referring now to the drawings, and more particularly to FIGS. 1, 2 and 3 thereof, there is shown a tool 10 which is adapted to be used by tractor trailer truck operators, and which is constructed in accordance with the present invention. The tool 10 generally comprises an elongated member 12 rigid throughout its length terminating at its rear end portion in a handle 14 and terminating at its front end portion in a socket 16 having an elongated axially-extending recess 18 opening outwardly and adapted to receive a load binder handle 20 of a load binder mechanism 22 as shown in FIG. 4. A hook 24 extends outwardly from the socket 16 and is adapted to engage a fifth-wheel release mechanism handle 26 of a fifth-wheel release mechanism 28 of FIG. 6. In use, the tool 10 serves as an extension of the load binder handle 20 of FIG. 4 for facilitating the locking and release of the load binder mechanism 22 for a vehicle (not shown), and the tool may also be used to engage with the hook thereon the fifth-wheel release mechanism handle 26 which is normally not located in an accessible area on a trailer. As shown in FIG. 5, the tool 10 also serves the purpose of checking the tire pressure of the vehicle by enabling the vehicle operator to strike the treads of a tire 31 with the socket 16 of the tool 10, so that the operator can by listening to the sound of the tool as it strikes the tire determine whether or not the tires are underinflated in a quick and easy manner.

Considering now the tool 10 in greater detail with reference to the drawings, the tool 10 includes a shank portion 33 which is preferably composed of wood and which includes a non-slip cork sleeve 35 surrounding the handle portion 14. The handle portion 14 terminates in a enlarged knob portion 37 for the purpose of enabling further the ease of gripping the tool 10 by the hands of the operator. The socket 16 is elongated and tubular in shape and is square in cross section for receiving the binder handle 20. A plurality of fastening devices, such as the wood screws 39 and 41, extend through holes in the sides of the socket 16 and are driven into a front end portion of the shank 33 extending within the back end portion of the socket 16. The socket 16 is composed of a rigid, heavy material, such as metal, so that when the tool 10 is used to check the tires of the vehicle as shown in FIG. 5, the tool socket 16 has substantial weight for providing a substantial impact against the treads of the tire 31. In this regard, the square shape of the socket 16 also facilitates the tire checking operation in that a flat face of the socket 16 readily engages the face of the tire 31. Moreover, the square shape of the socket 16 enables the tool 10 to be placed on the trailer without the necessity of securing it in place, since the square shape prevents the tool 10 from rolling along a flat surface. It should be understood that while the socket 16 is shown to have a square cross section, other cross-sectional shapes, such as a rectangular shape, may also be employed in accordance with the principles of the present invention. Also, while the tool 10 shown in the drawings includes separate shank and socket portions, a single one-piece construction, such as a metal one-piece unit, may be employed in accordance with the present invention.

In the illustrated embodiment of the present invention, as shown in FIG. 3, the front end portion of the shank 33 includes four equally-spaced flats, such as the flat 42, to facilitate the connection between the socket 16 and the shank 33. The shank 33 is tapered outwardly gradually from the handle 14 to the socket 16.

The hook 24 generally comprises a base portion 44 fixed to by any suitable technique, such as welding, to a flat external face 46 of the socket 16 opposite a flat external face 48 which serves as a base when the tool is resting on a flat surface. A hook-like member 51 is integrally connected to the base portion 44 and extends radially from the socket 16 and opens rearwardly toward the handle 14.

As shown in FIG. 4, when the tool 10 is used to facilitate the locking and release of the binder mechanism 22, the socket 16 is slipped over the end of the handle 20 of the binder mechanism 22, whereby in locking the mechanism 22, the tool 10 serves as an extension of the short handle 20 for gaining leverage to move the handle 20 to its over-center locking position to tightly secure the ends of a chain 53 about a load, such as the pipes 55, whereby the load may be held in place on the trailer of a tractor-trailer vehicle. In order to release the mechanism 22, the tool 10 may be used in the same manner as described for locking the mechanism 22 but the handle is moved from its locking position backwardly to its upstanding or release position shown in solid lines.

As shown in FIG. 5, the tool 10 may be used in checking the tire 31 by grasping the handle of the tool 10 and striking the treads of the tire 31 with the socket 16. If the operator hears a thud sound, the operator then knows that the pressure of the tire 31 may be inadequate and thus a more accurate determination of the tire pressure must be made before the vehicle is safe to operate. If the tool 10 in striking the tire 31 bounces back crisply, then the operator knows that the tire pressure is sufficiently high and that the vehicle is safe to operate. When the tool 10 is used to check the tire 31, the flat external face 48 of the socket 16 is used to strike the treads of the tire 31.

As shown in FIG. 6, the tool 10 may be used by the operator to reach around the tires of the vehicle and under the fifth-wheel coupling mechanism 28 to engage its handle 26 with the hook 24 of the tool 10, whereby the operator can move the handle 26 for releasing the mechanism 28 without injuring himself or his clothing.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. A tool for use on tractor-trailer trucks employing a load binder having a release handle and employing a fifth-wheel coupler having a release handle, comprising:

an elongated member rigid throughout its length terminating at its rear end portion in a handle and terminating at its front end portion in a socket having a recess therein for receiving the load binder handle, the socket being defined by a solid tubular member; and a hook fixedly mounted on and extending from said front end portion and adapted to engage the fifth-wheel release mechanism handle for moving it to actuate the mechanism, said hook having a base portion connected to said front end portion and having a hook-like portion including a radially-extending upstanding shank portion extending from said base portion, a reversely-bent smoothly curved portion extending backwardly therefrom and terminating in an inclined portion sloping from the outermost portion of said hook toward said base portion, the distal end portion of said inclined portion being blunt in shape and being spaced by a substantial distance from said outermost portion toward said base portion.

2. A tool according to claim 1 wherein said socket has at least one flat external face to serve as a base when the tool is resting on a flat surface.

3. A tool according to claim 2, wherein said socket and said recess are square in cross section.

4. A tool according to claim 2, wherein said hook is mounted on said socket opposite said flat face thereof.

5. A tool according to claim 4, wherein said handle portion of the tool is composed of wood and said socket is composed of metal, said socket being fixedly secured to said tool handle.

6. A tool according to claim 5, further including a non-slip cork sleeve surrounding said tool handle, said tool handle terminating in a knob.

7. A tool according to claim 2, wherein said tool includes a shank portion extending between said socket and said handle, said shank portion being tapered outwardly gradually from said handle to said socket.

8. A tool according to claim 1, wherein said distal end portion is spaced from said base portion by at least one-fourth of the distance between said outermost portion of said hook and said base portion.

* * * * *